Patented Jan. 16, 1923.

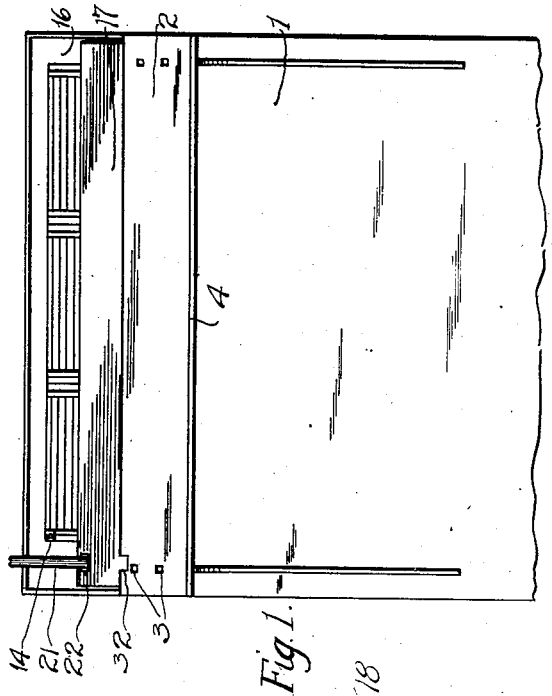
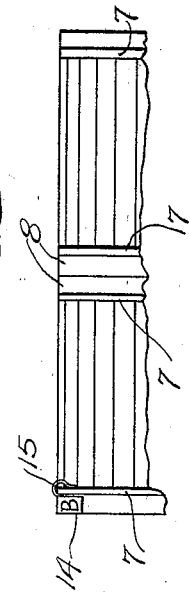
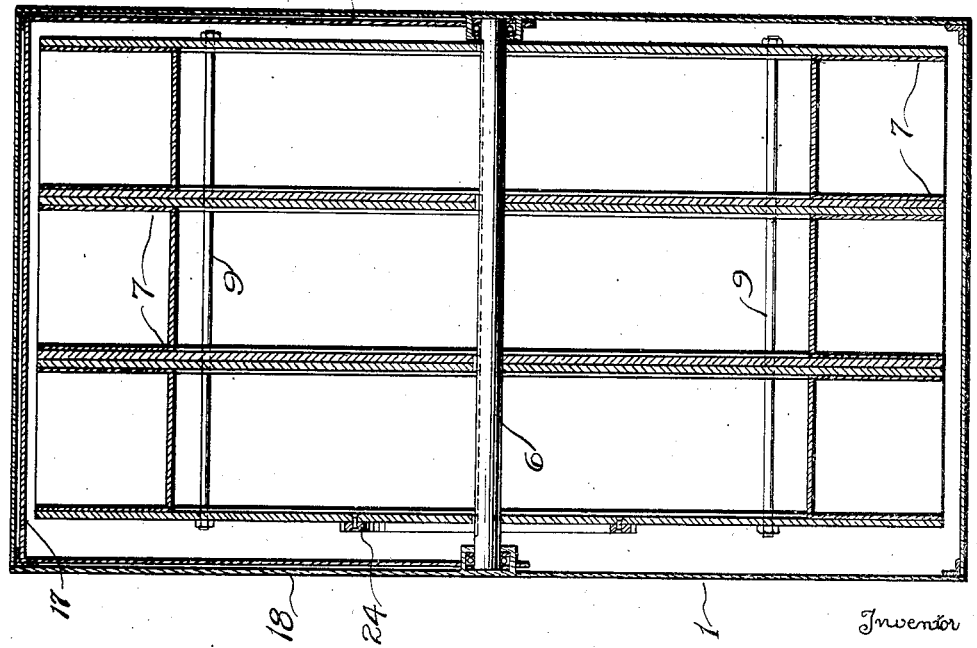

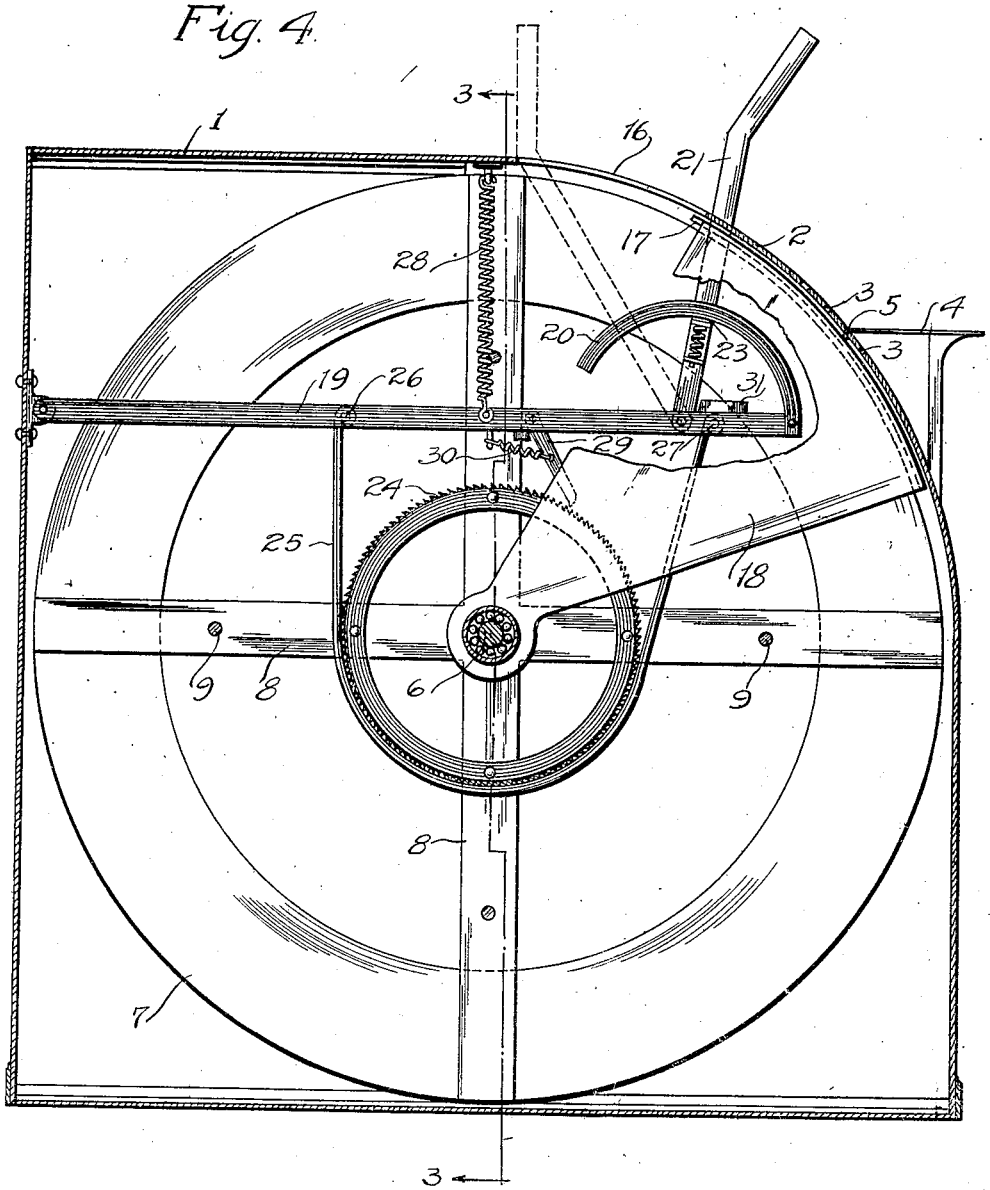

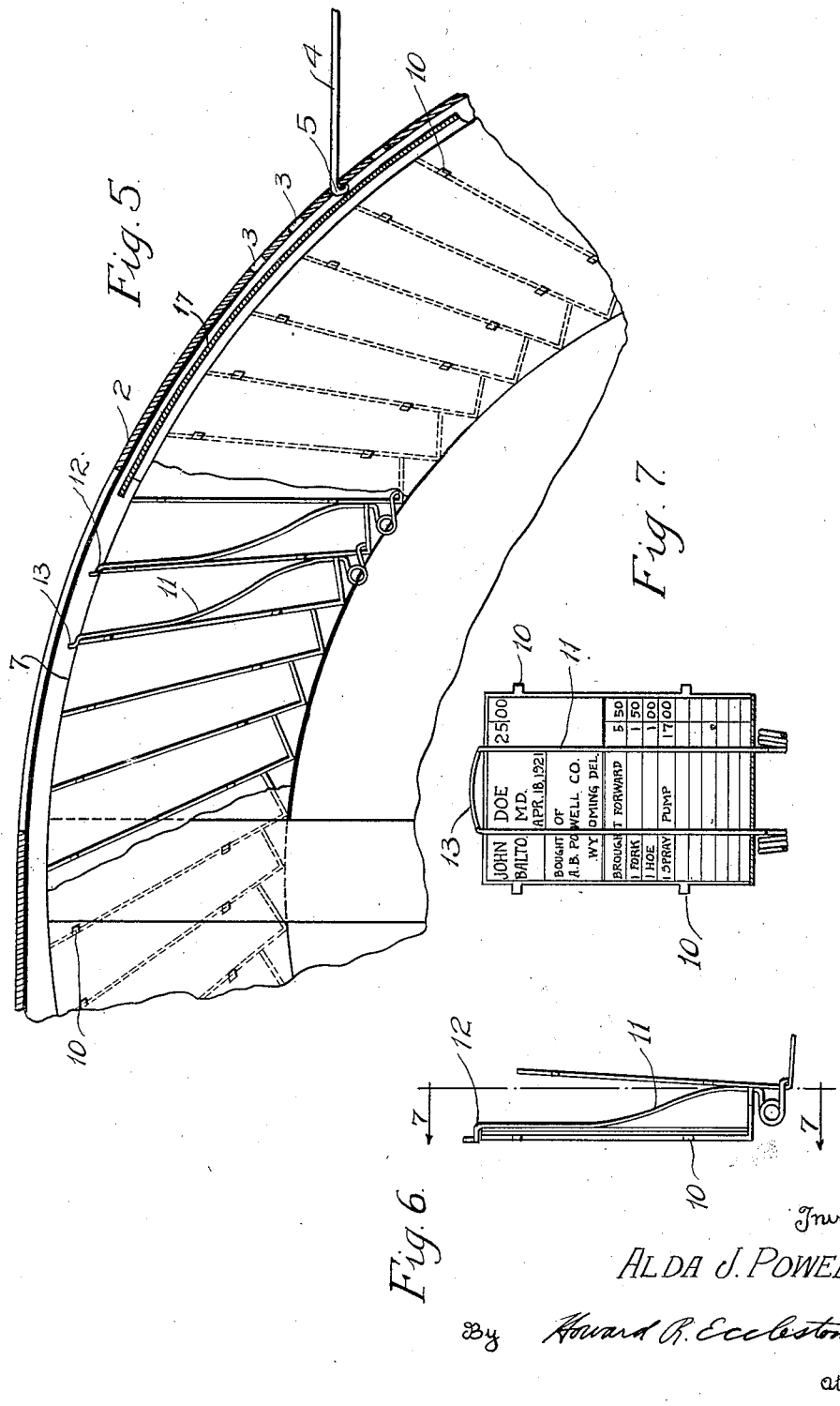

1,442,176

UNITED STATES PATENT OFFICE.

ALDA J. POWELL, OF WYOMING, DELAWARE.

VISIBLE-ACCOUNT FILE.

Application filed May 4, 1921. Serial No. 466,790.

*To all whom it may concern:*

Be it known that I, ALDA J. POWELL, a citizen of the United States, residing at Wyoming, Delaware, have invented certain new and useful Improvements in Visible-Account Files, of which the following is a full, clear, and exact description thereof.

My invention relates to revolving filing cabinets for accounts, and one of the objects of the invention is to provide a cabinet of this nature which is so constructed that the accounts carried therein are visible without removing them from the file, and without moving any part or parts of mechanism commonly associated with the filing pockets.

One of the many advantages resulting from my system of filing, wherein the name and amount of the account are visible, is that it eliminates the necessity of giving each name a number and keeping a record of the same in order to avoid giving two names the same number. It will be obvious that in my system it is unnecessary to keep any record, and it is unnecessary also to assign numbers to the names, as the names themselves are visible in the file.

Another advantage which may be mentioned is the great saving of time which is accomplished in locating accounts, by avoiding the necessity of first looking up the name in order to get the number of the account, and then locating the account under that number.

Still another advantage of my invention is that as there is no necessity of keeping a record of the names of the accounts, it follows that there is no necessity for having a number of the filing pockets idle merely because there is nothing charged to those particular accounts. In other words, in my system when an account is paid, that particular account is withdrawn and the pocket immediately becomes available for another account, and without the necessity of changing any records. In this way too, I also eliminate the necessity of a separate file for short accounts, as all accounts are handled in the same manner.

Another feature of my invention is a sliding cover which greatly facilitates the locating of the accounts desired.

In my system of filing, the amounts are carried at the top of the credit slips, and as these amounts are visible as well as the names of the accounts, it will be obvious that the accounts may be audited very quickly.

Another purpose of the invention resides in the provision of means by which the space allotted to the names under any particular letter may be quickly and easily enlarged or diminished; that is, the space allotted to the A's or B's may be easily increased or decreased as the conditions warrant.

Another purpose of the invention is to provide a filing cabinet of this character which will carry more accounts for the same size cabinet, than similar cabinets now known.

Another feature of the invention resides in the provision of a particular operating mechanism by which the filing cylinder may be revolved either rapidly or slowly, and by which it may be stopped at the exact point desired.

Another feature of my invention resides in the elimination of trays or similar devices for holding the credit slips.

My filing cabinet is simple in construction, and is relatively inexpensive to manufacture, and may be enlarged at small cost.

Other and further objects of the invention will appear as the description proceeds.

I will now describe in detail, with reference to the accompanying drawings, the preferred form of my invention, it being understood that many changes and modifications may be made therein without departing from the scope of the invention as defined in the appended claims.

In the drawings:

Figure 1 is a partial front elevation.

Figure 2 is an enlarged fragmentary view of two of the cylinders, showing the manner of attaching the markers.

Figure 3 is a vertical transverse section taken on the line 3—3 of Figure 4, the operating mechanism being removed.

Figure 4 is an end view, the end of the cabinet being removed to show the operating mechanism, and the support for the cover being broken away for the same reason.

Figure 5 is a fragmentary view of one of the cylinders, on an enlarged scale.

Figure 6 is a detail side view of one of the filing pockets and spring; and,

Figure 7 is a sectional view thereof taken on the line 7—7 of Figure 6.

Numeral 1 refers to the cabinet, which has the upper portion 2 of the front wall curved to conform to the curvature of the cylinders; and is provided with a series of holes 3 by which a shelf 4 may be detachably and adjustably mounted on the front of the cabinet by means of fingers 5 engaging the holes.

A rotatably mounted shaft 6 extends from one end of the cabinet to the other, and has keyed or otherwise secured thereon the desired number of independent cylinders, each complete in itself; three being shown in the drawings.

Each cylinder consists of two annular members 7, which are attached to spider frames 8, which are in turn keyed or otherwise secured to the shaft 6. Tie rods 9 may extend through the spider frames to reenforce the construction, and to more firmly secure together the independent cylinders.

Mounted between each pair of annular members is a series of partitions, preferably of sheet metal. The partitions are substantially of an L shape, so that the lower portion of the partition forms the bottom of the filing pocket, and the upper portion forms the rear wall of that pocket, so that when these partitions are arranged in series, a continuous series of pockets is formed, as clearly shown in Fig. 5. It is to be noted here that the pockets are not arranged radially, but are arranged tangentially to a circle which is concentric to, but which is some distance from the axis of the shaft 6. The purpose of this construction is to expose the accounts to a greater extent.

The partitions may be secured to the annular members in any desired manner, but the preferred construction is to provide the partitions with tabs 10, which will be passed through slots in the annular members, and be turned over in the usual manner. It will be understood, of course, that the annular members form the sides of the pocket.

For the purpose of preventing the credit slips from falling from the pockets as the cylinders are rotated, I provide a spring retainer indicated by the numeral 11. The construction of the spring is clearly indicated in Figs. 5, 6, and 7. The springs may be mounted in any desired manner, but in the construction shown the two ends of the springs pass through holes in the back of one of the pockets and are suitably secured. The two arms of the springs pass through slots in the bottom of the next pocket and extend outwardly to the outer end of the pockets, where they are bent downwardly as, indicated by numeral 12, to better hold the contents of the pockets. The two arms are then connected by an outwardly extending arc 13, which presents ready means for lifting the spring when it is desired to remove the contents of a pocket. By reference to Fig. 7, it will be apparent that the spring does not obscure any essential part of the account, in fact the right arm (Fig. 7) of the spring facilitates the reading of the account, in that this part of the spring marks the division between the amounts, and the articles or other data on the account slip.

While the particular credit slip per se forms no part of the present invention, it is my intention to use in my system of filing, a slip similar to that shown in Fig. 7. It will be noted that in this form of credit slip, the name of the debtor, and the total amount, are at the top of the slip; so that both are visible as the filing cabinet rotates. The particular credit slip forms the subject matter of a separate application, Ser. No. 470,405, filed May 17, 1921.

The accounts will be filed alphabetically, and preferably they will be filed transversely of the cabinet, i. e. the A's will extend entirely across the cabinet, and there will be as many rows provided for each letter as may be necessary.

As there is no necessity of keeping a book record of the accounts, the space provided for a certain letter may be increased or decreased without changing any records. For the purpose of indicating the accounts under the various letters, I provide an index member referred to by numeral 14, and in the present construction this index member is mounted on one of the annular members by means of a spring 15. By such a construction the index member may be quickly and easily placed in the proper position to correspond with an increase or decrease in the space provided for a certain letter.

An opening 16 is provided at the top front of the cabinet and this opening is adapted to be closed by a door 17, rotatably mounted on the journals for the shaft 6 by means of arms 18.

I will now described the means for operating the door and the filing cylinder.

A link 19 is pivotally mounted on the cabinet and carries adjacent its free end an arcuate member 20. Pivotally mounted on the link 19 is an operating lever 21 which extends upwardly and passes through an aperture 22 provided in the door, whereby as the lever is oscillated the door is swung forward or backward. The lever shown in dotted lines in Fig. 4 is in the position it assumes when the door is closed. For the sake of clearness, however, the door is not shown in closed position.

A spring pressed brake member, indicated by numeral 23, engages the arcuate member 20, and in this manner the door is held in any desired position.

A toothed operating wheel 24 is rigidly attached to one of the spider frames, and a brake band 25 passes around the toothed periphery thereof, the ends of the brake band being attached to the link 19, as indicated by numerals 26 and 27. The link 19 is normally held in elevated position by a spring 28, and the link in turn normally holds the brake band in frictional engagement with the operating wheel 24.

A pawl 29 is pivotally mounted on the link 19 and is held in engagement with the toothed wheel 24 by means of the spring 30. A lug 31 is mounted on, or is integral with, the link 19 and is adapted to be engaged by the lever 21 at the end of its forward movement, for a purpose which will appear hereinafter.

A slot 32 is provided in the cabinet to receive the lever 21 when the door is opened to its full extent.

Assuming the door to be closed, the operation is as follows:

The lever is drawn forward and by its engagement with the door the latter is also drawn forward. The accounts are thus exposed, and when the door has reached the desired position the lever is released and the door is held in that position by means of the brake 23 engaging the arcuate member 20. If the account desired does not appear in the area thus exposed the door will be drawn open to its full extent of course, and if the desired account is not then exposed it will be necessary to rotate the filing cylinder.

If the account desired should be some distance away it is desirable to rotate the cylinder rapidly, while if the account is adjacent to the exposed area, it is desirable to move the cylinder only slightly, and I have provided novel means for accomplishing this. After the lever 21 has been drawn back sufficiently to open the door, farther forward movement of the lever is prevented by its engagement with the lug 31, and the only possible farther movement of the lever is in a downward direction. As the lever, and consequently the link 19 are moved downwardly against the tension of the spring 28, the brake band 25 is released, and the pawl 29 engaging the toothed wheel 24 causes the latter to rotate together with the filing cylinders. The cylinders are thus rotated slightly, and immediately releasing the lever the brake band engages the toothed wheel and stops the rotation. If it is desired to rotate the cylinder rapidly and to a greater extent, it is only necessary to pull the lever down and hold it in that position, whereby the brake band remains released and the impulse given by the pawl causes the cylinders to revolve rapidly. When it is desired to stop the rotation the lever is simply released and the cylinder is stopped in the manner before described.

While I have shown three of the filing cylinders it will be understood that any number may be employed; it being only necessary to increase the length of the cabinet and the shaft on which they are supported.

From the foregoing description it will be apparent that I have produced a filing cabinet in which the names and the amounts are visible, and one in which it is unnecessary to move any element whatsoever in order to see the accounts.

It will also be apparent that there is no necessity of giving each account a number; and as each pocket becomes available as soon as the account is paid obviously there is no necessity of a separate filing system for short accounts.

Also as no book record is kept of the accounts, the space allotted for any particular letter may be quickly increased or decreased, and by moving the index member to the correct point, the space provided for that particular letter is indicated.

The operating mechanism which I have provided is also novel, and accomplishes the very desirable function of rotating the cylinder either rapidly or slowly, and also stopping the rotation at the desired point.

In accordance with the patent statutes I have described what I now believe to be the best embodiment of my invention, but I do not wish to be understood as limiting myself or the scope of the invention, as many changes and modifications may be made without departing from the spirit of the invention, and all such I aim to include in the scope of the appended claims.

Having fully described my invention, what I claim as new and desire to secure by Letters Patent is:

1. A filing cabinet including a filing cylinder rotatably mounted in the cabinet, a portion of the front wall of the cabinet being curved to conform substantially to the curvature of the cylinder, said front wall provided with an opening, a door for said opening, a lever operatively connected with said door, an arcuate member associated with the lever, and coacting means between the lever and arcuate member, whereby the door is held in any desired position.

2. A filing cabinet including a rotatably mounted filing cylinder, the front wall of the cabinet having an opening therein, a door for said opening, a lever for operating said door, and means connecting the lever with the filing cylinder, whereby the latter may be rotated.

3. A filing cabinet including a rotatably mounted filing cylinder, the front wall of the cabinet having an opening therein, a door for said opening, and a lever operatively connected with both the door and the filing cylinder.

4. A filing cabinet including a rotatably mounted filing cylinder, a toothed wheel connected with said cylinder, a pivotally mounted link associated with the toothed wheel, a pawl carried by said link and adapted to engage the toothed wheel, a brake band passing around said wheel and connected to said link, and means for operating said link.

5. A filing cabinet including a rotatably mounted filing cylinder, a toothed wheel connected with said cylinder, a pivotally mounted link associated with the toothed wheel, a pawl carried by said link and adapted to engage the toothed wheel, a brake band passing around said wheel and connected to said link, a spring for normally holding the link in elevated position, and means for operating said link.

6. A filing cabinet including a rotatably mounted filing cylinder, the front wall of the cabinet having an opening therein, a door for said opening, a toothed wheel connected with the cylinder, a pivotally mounted link associated with the toothed wheel, a pawl carried by the link and adapted to engage the toothed wheel, a brake band passing around the wheel and connected with the link, a spring normally holding the link in elevated position, and a lever operatively connected with said link and with said door.

7. A filing cabinet including a rotatably mounted filing cylinder, the front wall of the cabinet having an opening therein, a door for said opening, a toothed wheel connected with the cylinder, a pivotally mounted link associated with the toothed wheel, a pawl carried by the link and adapted to engage the toothed wheel, a brake band passing around the wheel and connected with the link, a spring normally holding the link in elevated position, an arcuate member carried by the link, a lever pivotally mounted on the link and operatively connected with said door, coacting means between the lever and arcuate member whereby the lever and door are held in adjusted position, and means for limiting the forward movement of said lever.

8. A filing cabinet comprising a casing, a rotary drum therein having end walls and a shaft, a series of partitions, each partition extending from one end wall to the other, said partitions forming a circular series of compartments occupying the entire space between said walls, and resilient retainers respectively positioned in said compartments and each adapted to frictionally engage with the face of a paper slip in its compartment and to positively engage with an edge of said slip.

9. A filing cabinet comprising a casing and a drum-like member mounted to rotate therein, said member comprising annular end walls, partitions arranged between said walls dividing the entire space between said walls into pockets, and retaining springs respectively mounted to extend across said pockets each adjacent to a partition and adapted to overlap and contact with the outer edge thereof.

10. A filing cabinet, including a rotary cylinder, partitions arranged in said cylinder to form pockets, the outer ends of the pockets being entirely open, whereby an unobstructed view of the contents of the pockets is possible, and retaining springs respectively mounted to extend across said pockets, each spring being adjacent to and bearing against the rear wall of the pocket and overlapping the outer edge thereof.

11. A filing cabinet, including a shaft, a rotary cylinder carried by said shaft, partitions arranged in said cylinder to form pockets adapted to receive paper slips, the outer ends of said pockets being entirely open to provide an unobstructed view of the contents thereof, and a two-arm spring retainer for each pocket having both legs at its free end bent back to overlap and engage the outer edge of said partition.

12. A filing cabinet, comprising a rotary cylinder, pockets arranged in said cylinder, and a spring retainer provided for each pocket, said retainer being attached to the wall of one pocket and then passed radially outward through the bottom wall of the adjacent pocket and arranged to engage with and overlap the outer edge of the wall of said pocket.

13. A filing cabinet having a normally closed casing provided with a door, a paper-holding drum in said casing, drum-rotating devices, manual means connected to both the door and the drum-rotating devices and adapted for moving them in proper sequence.

ALDA J. POWELL.